United States Patent
Tzadok et al.

(10) Patent No.: US 7,627,177 B2
(45) Date of Patent: *Dec. 1, 2009

(54) ADAPTIVE OCR FOR BOOKS

(75) Inventors: Asaf Tzadok, Nesher (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/276,907

(22) Filed: Nov. 24, 2008

(65) Prior Publication Data

US 2009/0220175 A1 Sep. 3, 2009

Related U.S. Application Data

(63) Continuation of application No. 12/040,946, filed on Mar. 3, 2008, now Pat. No. 7,480,411.

(51) Int. Cl.
G06K 9/18 (2006.01)
(52) U.S. Cl. .............. 382/182; 382/185; 382/186; 358/1.11
(58) Field of Classification Search .......... 382/182
See application file for complete search history.

(56) References Cited

U.S. PATENT DOCUMENTS

| | | | | |
|---|---|---|---|---|
| 4,944,022 A | * | 7/1990 | Yasujima et al. | 382/155 |
| 5,359,673 A | * | 10/1994 | de La Beaujardiere | 382/229 |
| 5,583,949 A | * | 12/1996 | Smith et al. | 382/199 |
| 5,625,711 A | * | 4/1997 | Nicholson et al. | 382/224 |
| 5,754,671 A | * | 5/1998 | Higgins et al. | 382/101 |
| 5,917,941 A | * | 6/1999 | Webb et al. | 382/177 |
| 5,933,525 A | * | 8/1999 | Makhoul et al. | 382/186 |
| 5,966,460 A | * | 10/1999 | Porter et al. | 382/159 |
| 6,028,970 A | * | 2/2000 | DiPiazza et al. | 382/309 |
| 6,154,579 A | * | 11/2000 | Goldberg | 382/310 |
| 6,295,543 B1 | * | 9/2001 | Block et al. | 715/234 |
| 6,327,385 B1 | * | 12/2001 | Kamitani | 382/177 |
| 6,385,350 B1 | * | 5/2002 | Nicholson et al. | 382/309 |
| 6,678,415 B1 | * | 1/2004 | Popat et al. | 382/226 |

(Continued)

OTHER PUBLICATIONS

IOCR: An Intelligent Optical Character Reader, Leung et al., The Chinese University of Hong Kong, IEEE 1989.

(Continued)

*Primary Examiner*—Matthew C. Bella
*Assistant Examiner*—Sath V. Perungavoor
(74) *Attorney, Agent, or Firm*—The Law Firm of Andrea Hence Evans, LLC

(57) ABSTRACT

A system is presented for scanning entire books or document all at once using an adaptive process where the book or document has known fonts and unknown fonts. The known fonts are processed through a verification system where sure words and error words are determined. Both the sure words and error words are sent to OCR training where they are re-OCR'ed and repeatedly verified until they meet a predetermined quality criteria. Characters or words not meeting the predetermined quality criteria receive additional OCR training until all the characters and words pass the predetermined quality criteria. Unknown fonts are scanned and clustered together by shape. Outliers in the shapes are manually keyed-in. Those symbols that are manually classified go to OCR training and then to the known type optimization process.

1 Claim, 3 Drawing Sheets

U.S. PATENT DOCUMENTS

| | | | |
|---|---|---|---|
| 6,701,023 B1 * | 3/2004 | Gaither et al. | 382/254 |
| 6,738,518 B1 * | 5/2004 | Minka et al. | 382/218 |
| 7,092,870 B1 | 8/2006 | Chen et al. | |
| 7,106,905 B2 * | 9/2006 | Simske | 382/229 |
| 7,236,632 B2 | 6/2007 | Erol et al. | |
| 7,240,062 B2 * | 7/2007 | Andersen et al. | 707/100 |
| 2002/0076111 A1 * | 6/2002 | Dance et al. | 382/229 |
| 2002/0122594 A1 * | 9/2002 | Goldberg et al. | 382/198 |
| 2003/0152269 A1 * | 8/2003 | Bourbakis et al. | 382/187 |
| 2004/0223197 A1 * | 11/2004 | Ohta et al. | 358/538 |
| 2005/0276519 A1 * | 12/2005 | Kitora et al. | 382/305 |
| 2006/0215937 A1 * | 9/2006 | Snapp | 382/311 |
| 2008/0063279 A1 * | 3/2008 | Vincent et al. | 382/182 |
| 2008/0144977 A1 * | 6/2008 | Meyer et al. | 382/309 |

OTHER PUBLICATIONS

IBM TDB, N9, 02-92, pp. 256-260 entitled "Multi-Font Recognition Method Using a Layered Template Dictionary" by S. Katoh et al., 1992.

* cited by examiner

ADAPTIVE OCR FOR BOOKS

RELATED APPLICATIONS

The present application is a continuation of prior U.S. application Ser. No. 12/040,946, filed Mar. 3, 2008, the entirety of which is incorporated herein by reference.

FIELD OF THE INVENTION

This invention relates to Optical Character Recognition (OCR). It specifically relates to a system of adaptive OCR for books and other documents with known and unknown characters or fonts.

BACKGROUND OF THE INVENTION

OCR (Optical Character Recognition) has become one of the most widely used tools of modern document processing. Typical commercial OCR engines are designed for the recognition of a wide variety of text images ranging from letters and business forms to scientific papers. It is common wisdom that superior performance can be achieved if OCR engine is trained to each specific type of documents. Hence, adaptive OCR engines have been developed. In these engines, automatic recognition results are corrected and the OCR engine is being adapted "on the fly." Large digitization efforts are done today on library collections and archive centers around the world. These efforts scan books, newspapers and other documents, OCR them and create an electronic representation of the content. Hence, the importance of OCR quality is growing. Unfortunately, commercial OCR engines are imperfect. Some improvement can be achieved by performing spelling check using language dictionaries. However, such dictionaries tend to be incomplete (especially for historic texts and/or texts containing many special terms/names). Improvements due to these adaptive approaches remain insufficient. Hence, library collections and archive centers must either tolerate low quality data or invest large amounts of money in the manual correction of the OCR results.

SUMMARY OF THE INVENTION

It is an aspect of an embodiment of the present invention to provide an adaptive optical character recognition (OCR) system for a book having at least one page with known and unknown fonts. The system comprises the entire book, wherein the entire book is scanned and OCR of the entire book is performed. A verification process is applied for the known fonts, wherein the unknown fonts are clustered by shape. At least one sure word is separated out from at least one error words, wherein the sure words and error words are sent to an OCR training. Outliers are determined and the unknown fonts are manually classified. The manually classified fonts are sent to OCR training and the manually classified fonts are processed through the verification for known fonts and the sure words are separated out from error words. Manually classified results are processed to a quality evaluator.

The sure words are placed in a depository if they meet a predetermined quality criteria and sure words, error words and manually classified fonts are processed as required using an iterative process until all fonts meet the predetermined quality criteria.

DETAILED DESCRIPTION OF THE INVENTION

Figure 1:
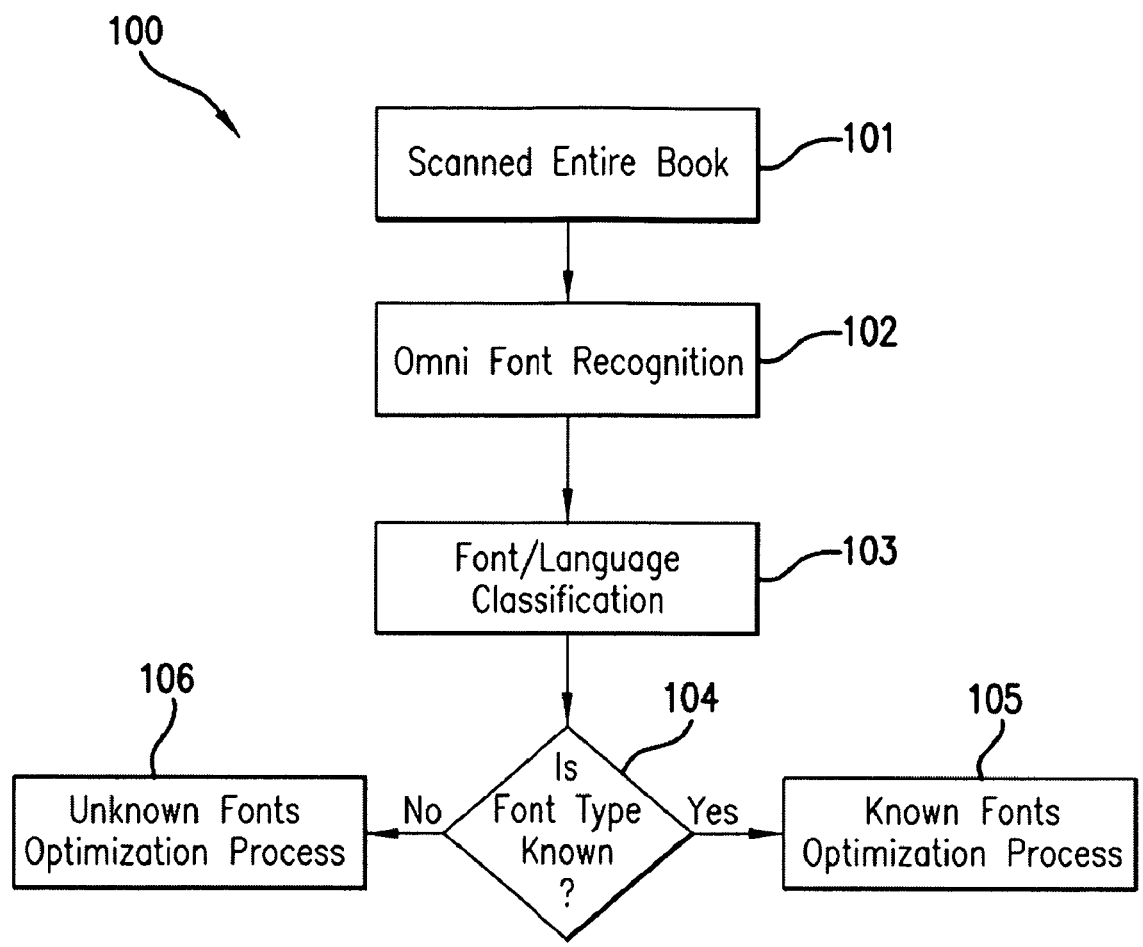
FIG. 1 is the high level system architecture according to an embodiment of the present invention.

Throughout the specification the terms "font" or "font type" refer to the font shape or font size. For example, the letter "k" here is a Times New Roman font shape with a font size 12. Both the font shape and font size can be handled separately by the present invention. A high level system architecture 100 according to an embodiment of the present invention is depicted in FIG. 1. An entire book is scanned and processed (including image enhancement, de-noising and de-skewing) at 101. It is noted that according to an embodiment of the present invention, the book at 101 may be scanned at any resolution. Preferably, the present invention uses 300 dpi. However, the system/process is designed to handle poor image quality scans down to 100 dpi. The conventional OCR is applied (e.g. using one of the commercial omni-font OCR engines) at 102. This process creates the first draft of the recognition results. In addition, book text is split in the uniform areas corresponding to different languages (in multilingual books) and different fonts that may be used for each of the languages at 103. Each such font type would be handled separately. For fonts that are known to the system at 104, the system progresses to a known fonts optimization 105 to be discussed in reference to FIG. 2. For those font that are not known to the system at 104, the system progresses to 106 to an unknown fonts optimization process 106 to be discussed in reference to FIG. 3. It is noted that those skilled in the art will realize that the method of FIG. 1 may be modified without departing from the spirit and scope of the present invention.

According to one embodiment of the present invention instead of adapting one all purpose OCR as in the conventional OCR processing, the present invention uses a bank of adaptive OCR engines each tuned to the specific font type. For example, the present invention may include a Times New Roman OCR engine and a font size 12 OCR engine. In principle, the present invention distinguishes between two possible scenarios:

1) When given font is known to the system
2) When given form is completely unknown.

In the first case, the present invention assumes that the omni-font OCR provides reasonable (though imperfect) results. Hence, draft OCR results can be used for further OCR tuning or training. In the second case, symbols to be recognized may be totally unknown to the system. Therefore, some draft OCR capabilities must be created before optimization can be started.

Figure 2:
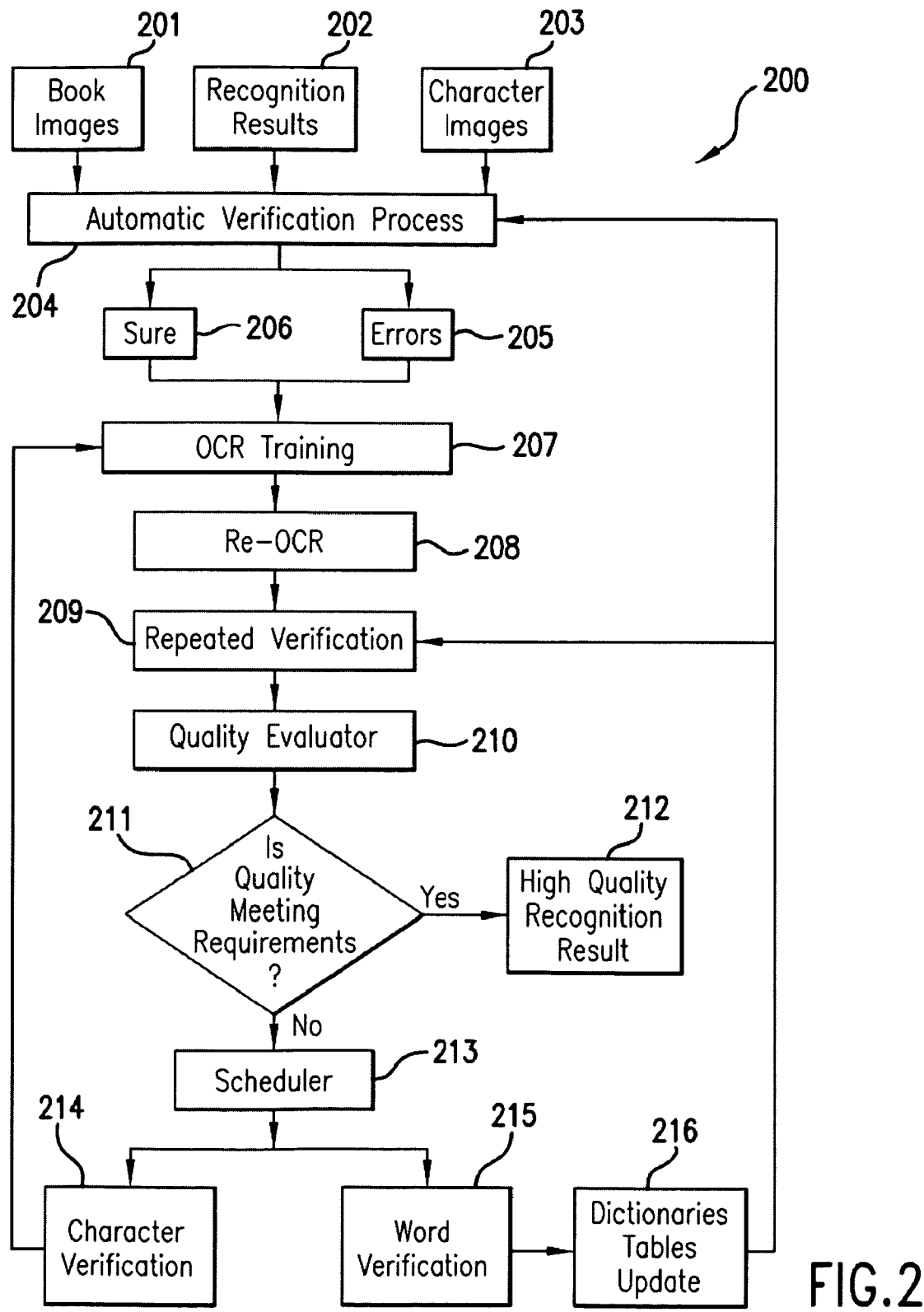
FIG. 2 is a known fonts optimization process according to an embodiment of the present invention.

A known fonts optimization process 200 according to an embodiment of the present invention is depicted in FIG. 2. Draft OCR results 201-203 are fed into the verification system 204. Verification system 204 may use dictionaries of the given language or dictionaries compiled for the given domain (i.e. the subject domain relevant to the given book). The present invention can apply statistical tables (such as probabilities of occurrences of different character strings as computed for the entire book). Such verification processes would identify recognition results deemed to be sure (e.g. cases where a fuzzy search has identified a given word in the dictionary and there are no other likely candidates). Each "sure word" 206 determines some correct characters (i.e. characters such that OCR results match the recognized word). In addition, some OCR errors 205 may be found as well for cases where OCR result doesn't match the word in question. This information (regarding correct and incorrect recognition results) can be used in order to train the OCR engine at 207 (for instance, if OCR is based on the template matching approach, character images can be used in order to learn appropriate character templates valid to the specific book in question). Retrained OCR at 207 can be used for repeated recognition at 208 followed by another verification at 209. Thus quality of the OCR results would be improved in an iterative manner. After each iteration, image quality would be estimated at 210-211. Results surpassing customer requirements/predetermined quality criteria (e.g. high confidence OCR results that match dictionary/statistical tables expectations) would be passed to the final output repository at 212. Remaining results would be routed by scheduler 213 to manual verification/correction at 214-215. However, in this embodiment proposed by present invention, manual verification process would be controlled by the adaptive process requirements. Accordingly, text to be corrected would be sent to the scheduler module 213. There, recognition results would be analyzed and adaptive needs would be determined. For instance, if text contains many low confidence characters "a" that means that the "a" template must be adjusted. Accordingly, OCR adaptivity requires a large number of "a" samples. In order to obtain such samples, the system would extract large number of character images likely to be "a". These images are sent for manual verification creating high quality data to be used for OCR training purposes. It is noted that according to one embodiment of the present invention, it is not necessary to process the book or document sequentially. Conventional OCR engines process page 1, then page 2 and so on. According to an embodiment of the present invention, certain characters on page 10 may need to be processed first and then the method may return to page 1 or another page of particular interest based on character content.

In addition to character level training, one method according to the present invention calls for simultaneous adaptation of the verification dictionaries. Consider for example an historic book dealing with the First World War. The names of the politicians are likely to be excluded from the general purpose dictionaries. However, they can be identified as strings reoccurring in the text. Of course, such reoccurring strings can be also caused by the OCR errors. Accordingly, manual word verification at 215 would be used in order to determine whether a given string should be added to the specific book dictionary at 216 or discarded. The entire process would be repeated as required until the entire text passes the predetermined quality criteria. It is noted that those skilled in the art will realize that the method of FIG. 2 may be modified without departing from the spirit and scope of the present invention.

Figure 3:
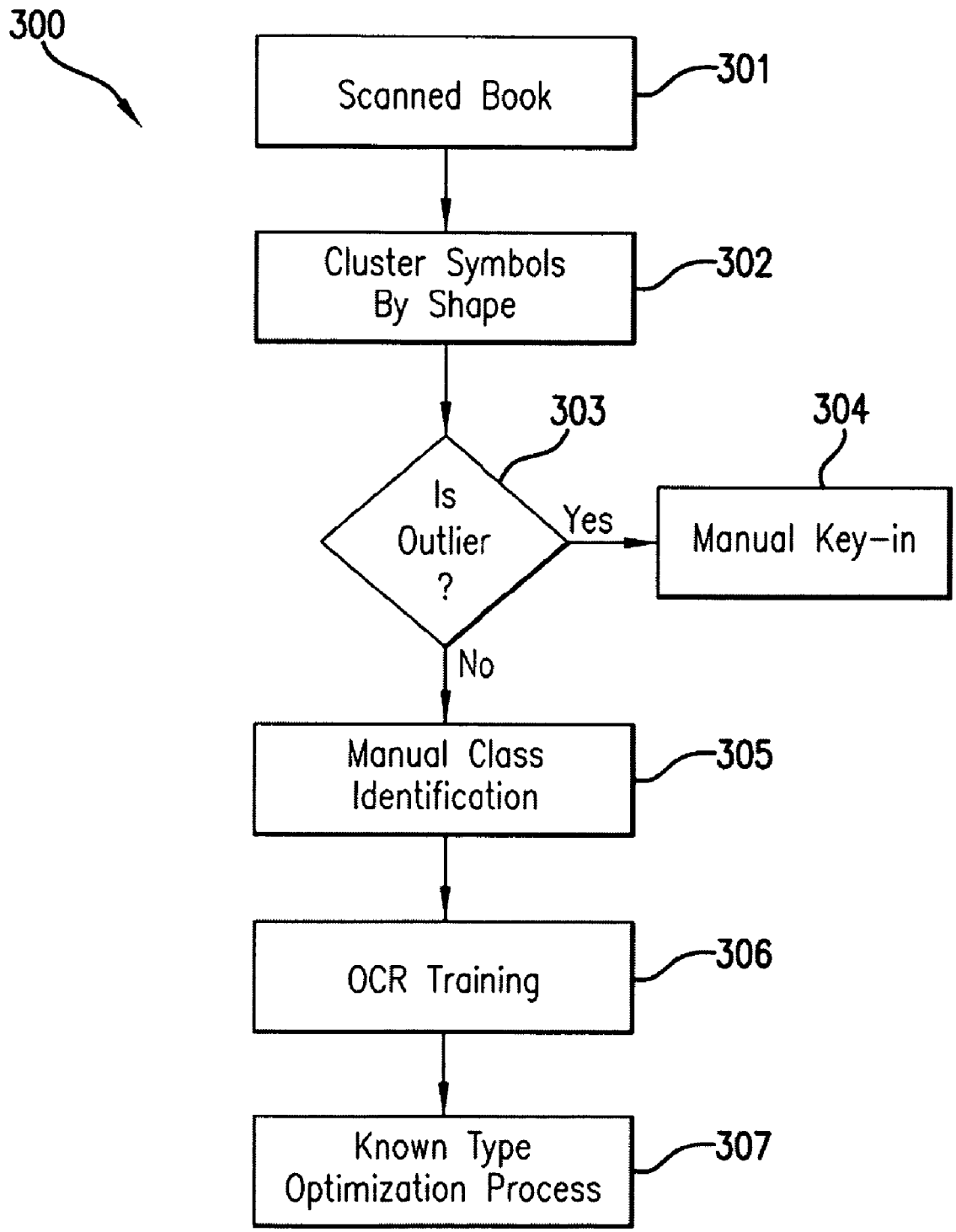
FIG. 3 is an unknown fonts optimization process according to an embodiment of the present invention.

Naturally, the aforementioned approach according to an embodiment of the present invention makes sense only if the initial draft results have some level of accuracy. Otherwise, no automatic verification and adaptation are possible. Now consider, for example, the case of a book or document containing unknown symbols (e.g. company logos). Clearly, no standard OCR will work for such symbols. Accordingly, the present invention proposes through another embodiment of a system/process for unknown fonts optimization as depicted in FIG. 3. FIG. 3 illustrates an unknown fonts optimization process 300 according to an embodiment of the present invention. There, the system 300 will segment the text image at 301 in order to identify individual symbol images (e.g. by assuming that each connected component is a symbol). Then symbols are be clustered by shape at 302. Each cluster is presumed to contain different samples of the same symbol. Classification of the symbol can be done manually at 304 (e.g. by showing one representative image for manual key-in by a skilled operator). Once the classification is known at 305, the OCR engine can be trained at 306. Finally, the optimization process 200 of FIG. 2 at 307 is applied in order to optimize and refine recognition results. It is noted that those skilled in the art will realize that the method of FIG. 3 may be modified without departing from the spirit and scope of the present invention.

In reference to FIGS. 1-3, it is noted that the system/method according to the embodiments of the present invention OCR's the entire book or document all at once and then makes an analysis that determines the optimal path for the most effective error detection.

Those of ordinary skill in the art will recognize that the steps shown in FIGS. 1-3 can be performed in any order and are not limited to the embodiments described herein.

The invention has been described in detail with particular reference to certain preferred embodiments thereof, but it will be understood that variations and modifications can be effected within the spirit and scope of the invention.

The invention claimed is:

1. An adaptive optical character recognition (OCR) system for a book having at least one page with known and unknown fonts comprising:
    the entire book, wherein the entire book is scanned and OCR of the entire book is performed;
    a verification process applied for the known fonts, wherein the unknown fonts are clustered by shape;
    at least one sure word separated out from at least one error words,
    wherein the sure words and error words are sent to an OCR training,
    wherein outliers are determined,
    wherein the unknown fonts are manually classified,
    wherein the manually classified fonts are sent to OCR training and the manually classified fonts are processed through the verification for known fonts and the sure words are separated out from error words;
    manually classified results are processed to a quality evaluator;
    wherein the sure words are placed in a depository if they meet a predetermined quality criteria and sure words, error words and manually classified fonts are processed as required using an iterative process until all fonts meet the predetermined quality criteria.

\* \* \* \* \*